United States Patent [19]

Nakamura et al.

[11] Patent Number: 4,682,576
[45] Date of Patent: Jul. 28, 1987

[54] INTAKE SYSTEM FOR DIESEL CYCLE ENGINES

[75] Inventors: Saburo Nakamura, Higashihiroshima; Shigeru Sakurai; Takumi Nishida, both of Hiroshima; Masanori Sahara, Higashihiroshima, all of Japan

[73] Assignee: Mazda Motor Corporation, Hiroshima, Japan

[21] Appl. No.: 741,884

[22] Filed: Jun. 6, 1985

[30] Foreign Application Priority Data

Jun. 10, 1984 [JP] Japan .................. 59-85942[U]

[51] Int. Cl.⁴ .................. F02M 35/10; F02M 31/02
[52] U.S. Cl. .................. 123/179 A; 123/52 MF; 123/179 H; 123/276; 123/302; 123/308
[58] Field of Search .......... 123/179 A, 179 B, 179 H, 123/52 MF, 302, 308, 432, 587, 588, 276

[56] References Cited

U.S. PATENT DOCUMENTS

| | | | |
|---|---|---|---|
| 2,108,296 | 2/1938 | Roualet | 123/179 A |
| 2,177,840 | 10/1939 | Roualet | 123/179 H |
| 2,889,820 | 6/1959 | Grözinger | 123/179 A |
| 3,374,773 | 3/1968 | Scherenberg | 123/276 |
| 3,656,465 | 4/1972 | Frankle | 123/179 H |
| 3,935,842 | 2/1976 | Ishizawa et al. | 123/52 MF |
| 4,051,674 | 10/1977 | Suzuki | 123/587 |
| 4,509,466 | 4/1985 | Bernardoni et al. | 123/52 MF |

FOREIGN PATENT DOCUMENTS 55-165935 11/1980 Japan .
56-154538 11/1981 Japan .
58-152123 9/1983 Japan .................. 123/432

OTHER PUBLICATIONS

Kanesaka, et al., "A New Cold Starting System for Diesel Engines", 14th CIMAC Helsinki Conference (2), pp. D40-1 to D40-12.

Primary Examiner—Andrew M. Dolinar
Attorney, Agent, or Firm—Fleit, Jacobson, Cohn & Price

[57] ABSTRACT

A diesel engine intake system including a timing valve which is positioned in the intake system in engine starting and warming-up period under a cold engine condition. The timing valve is opened in the final period of the intake stroke so that a strong suction pressure is produced in the combustion chamber before the timing valve is opened. When the timing valve is opened, the intake air is rushed into the combustion chamber at a high speed whereby the intake air is compressed under the inertia of the high speed flow to thereby increase the temperature of the intake air. The timing valve is responsive to the suction pressure in the combustion chamber and opened when the suction pressure becomes stronger than a predetermined level.

24 Claims, 12 Drawing Figures

(a) 750rpm (b) 300rpm

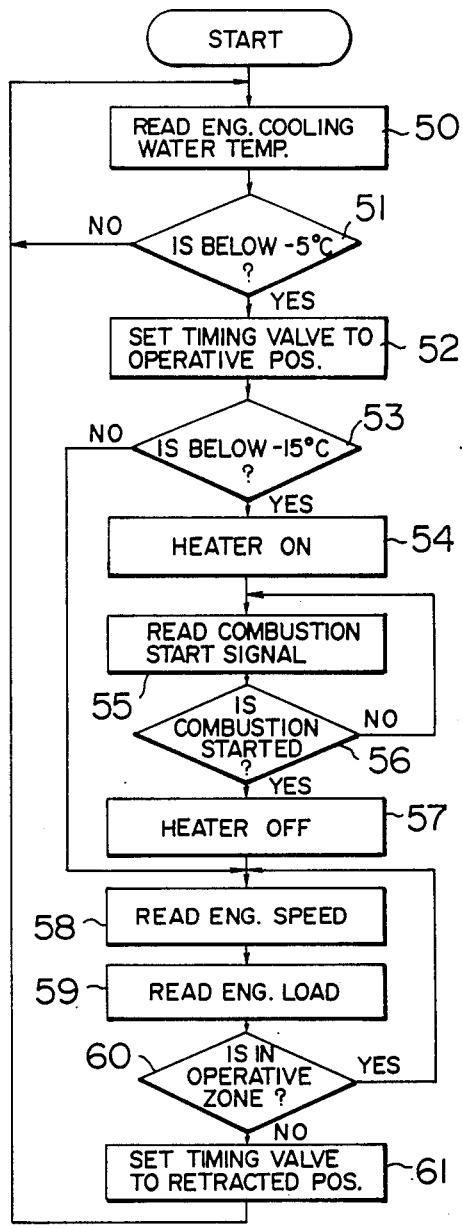

INTAKE SYSTEM FOR DIESEL CYCLE ENGINES

BACKGROUND OF THE INVENTION

1. Field of the Invention

The present invention relates to diesel cycle engines, and more particularly to intake systems for diesel cycle engines. More specifically, the present invention pertains to intake systems having means for increasing the intake air temperature in diesel cycle engines.

2. Description of Prior Art

In diesel cycle engines, efforts have continuously been made to improve starting and warming-up properties. In order to improve the properties, it has been recognized as being effective, to increase the temperature of the intake gas as it is drawn into the combustion chamber. It is also important to increase the intake air temperature for suppressing pollutant emissions in the exhaust gas. In order to accomplish these purposes, proposals have been made to have the intake gas compressed in the final period of the intake stroke to thereby raise the temperature thereof. For example, Japanese utility model application 54-65135 filed on May 16, 1979 and published for public inspection on Nov. 28, 1980 under the disclosure number 55-165935 teaches to provide the intake passage with an intake throttle valve which is adapted to be closed in the engine starting period and to open the exhaust valve momentarily in the final period of the intake stroke and the beginning period of the compression stroke. With this arrangement, a strong suction pressure is produced in the combustion chamber in the intake stroke due to the influence of the throttle valve so that the exhaust gas is rapidly drawn into the combustion chamber as soon as the exhaust valve is opened in the final period of the intake stroke. The exhaust gas thus drawn into the combustion chamber functions to compress the intake air to thereby increase the temperature of the intake air. The temperature of the exhaust gas itself also has an effect of increasing the temperature of the intake air. A similar system is also disclosed by Japanese utility model disclosure number 56-154538 which has been published on Nov. 18, 1981.

It has been reported by Hiroshi Kanesaka et al. in the 14th CIMAC Helsinki Conference (2) that this type of intake system has shown significantly improved starting and warming-up properties. It should however be noted that the proposed system is disadvantageous in that there is a high possibility that the exhaust gas is drawn back into the combustion chamber not only in the starting and warming-up periods but also in the other engine operating conditions. According to the proposals made by the aforementioned utility models, the exhaust cam for actuating the exhaust valve is formed with an auxiliary lobe in addition to a main lobe so that the exhaust valve is opened by the main lobe to provide the exhaust stroke and by the auxiliary lobe in the final period of the intake stroke and the beginning period of the compression stroke to have the exhaust gas drawn back to the combustion chamber. In this structure, it is understood that the auxiliary lobe on the exhaust gas operates throughout the engine operation so that the exhaust valve is opened in the final period of the intake stroke even when the engine is operated under load. Since the exhaust gas pressure is higher than the intake gas pressure even when the intake throttle valve is wide open, it is very likely that the exhaust gas is drawn back into the combustion chamber under a heavy load engine operation causing a decrease in the engine output.

It is of course possible to design that exhaust valve operating mechanism so that the auxiliary lobe is effective only in the starting and warming-up periods. However, this solution is undesirable because the valve actuating mechanism becomes very complicated and unreliable.

SUMMARY OF THE INVENTION

It is therefore an object of the present invention to provide an intake system for diesel engines in which the intake air can be compressed in starting and warming-up periods as it is introduced into the combustion chamber under the inertia of the intake air flow.

Another object of the present invention is to provide an intake system for diesel engines, which has means for compressing the intake air under inertia in the starting and warming-up period without relying on the engine exhaust gas pressure.

A further object of the present invention is to provide a diesel engine intake system having means for compressing the intake air and auxiliary means for further increasing the intake air temperature.

According to the present invention, the above and other objects can be accomplished by an intake system for diesel cycle engines comprising intake passage means leading through intake port means to combustion chamber means, suction pressure responsive valve means provided in said intake passage means for closing said intake passage means in a beginning period of intake stroke wherein the intake port means is opened to said combustion chamber means but opening said intake passage means in the remainder period of the intake stroke. More specifically, the valve means includes a valve member which is movable between a closed position wherein it closes the intake passage means and an open position wherein it opens the intake passage means, biasing means for biasing the valve member toward said closed position, said valve member having a first surface which is subjected in said closed position to a pressure in said intake passage means upstream the valve means and a second surface which is subjected in said closed position to a pressure in the combustion chamber means so that a difference between the pressures on the first and second surfaces of the valve member assists the biasing means biasing the valve member to the closed position, valve actuator means comprising suction pressure chamber means defined at least partly by pressure responsive movable member, means connecting said movable member with said valve member so that a movement of the movable member is transmitted to the valve member and communicating passage means for communicating said suction pressure chamber means with said intake passage means downstream the valve means so that a suction pressure produced in said intake passage means downstream the valve means in the intake stroke is introduced into the suction pressure chamber means to cause a movement of the movable member for moving the valve member under said suction pressure from the closed position to the open position after said beginning period of the intake stroke and maintaining the valve member at the open position at least until bottom dead center of the intake stroke.

The valve member may be connected directly with the pressure responsive movable member and the valve member and the movable member may be housed in a casing. In this case, the casing may define, together with the movable member, said suction pressure chamber means. The valve member may have a valve stem which is connected with the movable member and the communication passage means may then be formed in said valve stem.

With the arrangements described above, since the intake passage means in closed in the beginning part of the intake stroke, a strong suction pressure is produced in the combustion chamber means and the valve means is opened when the suction pressure reaches a predetermined valve to allow the intake air to rush into the combustion chamber. The intake air is then compressed under the inertia to an extent that its temperature is raised. Preferably, heating means is provided in the intake passage upstream the valve means.

In a preferable aspect, the timing valve means is provided retractably in the intake passage means and control means is provided for retracting said timing valve means from said intake passage means except under a predetermined engine operating condition.

The above and other objects and features of the present invention will become apparent from the following descriptions of preferred embodiment taking reference to the accompanying drawings.

BRIEF DESCRIPTION OF THE DRAWINGS

FIG. 11 is a flow chart showing the operation of the timing valve retracting mechanism; and, FIG. 12 is a sectional view showing another embodiment of the present invention.

DESCRIPTIONS OF THE PREFERRED EMBODIMENT

Figure 1:
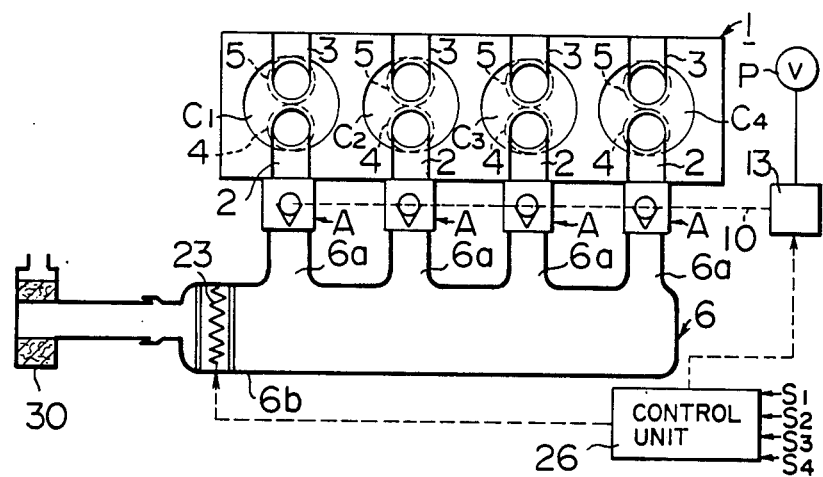
FIG. 1 is a diagrammatical view of a diesel cycle engine having an intake system in accordance with one embodiment of the present invention.
Figure 2:
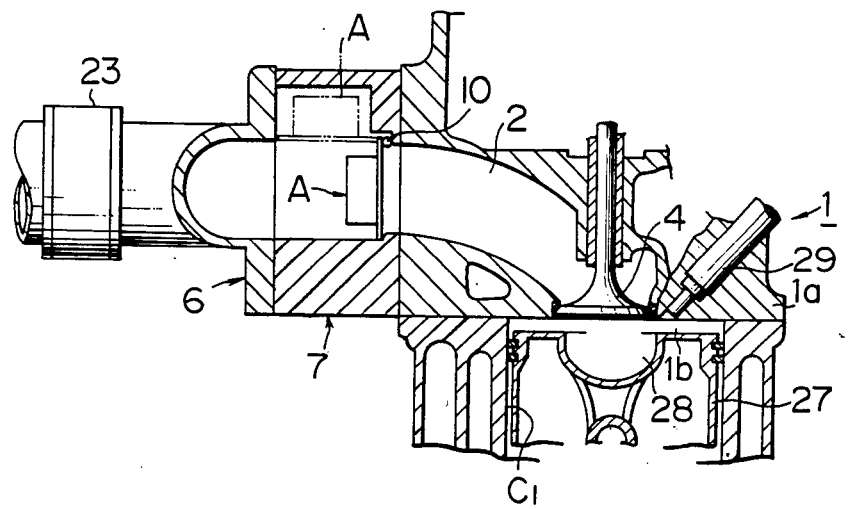
FIG. 2 is a sectional view showing the arrangement of the timing valve.

Referring to the drawings, particularly to FIG. 1, there is shown a four stroke diesel engine including a cylinder block 1 formed with four cylinder bores $C_1$, $C_2$, $C_3$ and $C_4$. As shown in FIG. 2, a cylinder head 1a is attached to the top of the cylinder block 1 and a piston 27 is received in each cylinder bore for reciprocating movements. Thus, a combustion chamber 1b is defined in each cylinder bore. The cylinder head 1a is formed with intake ports 2 and exhaust ports 3 which open to the respective combustion chambers 1b. Each of the intake ports 2 is provided with an intake valve 4 and each of the exhaust ports 3 is provided with an exhaust valve 5. The piston 27 is formed at the top with a cavity 28 and a fuel injector 29 is mounted on the cylinder head 1a so as to inject fuel toward the cavity 28 in the piston 27. Although not shown in the drawings, the engine has valve actuating mechanisms for actuating the intake and exhaust valves 4 and 5 at appropriate timings.

There is provided an intake manifold 6 which includes branch intake passages 6a and a main intake passage 6b communicating with the branch passages 6a. The branch passages 6a are respectively connected with the intake ports 2 for the cylinder bores $C_1$, $C_2$, $C_3$ and $C_4$. The main intake passage 6b is provided at the upstream end with an air cleaner 30 and a heater 23 is provided downstream the aircleaner 30 to heat the intake air.

Figure 3:
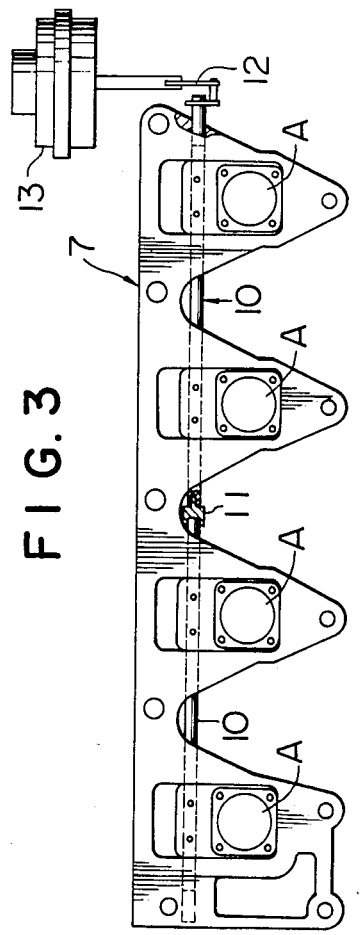
FIG. 3 is a front view of the timing valve retracting mechanism.

At the junction between each intake port 2 and the branch intake passage 6a, there is provided a timing valve A which is of a suction pressure responsive type. As shown in detail in FIGS. 3 and 4, the timing valves A are carried by a valve support block 7 which is disposed between the cylinder block 1 and the intake manifold 6. The valve support block 7 is formed with connecting passages 7a which connect the respective ones of the branch passages 6a with the corresponding intake ports 2.

Figure 4:
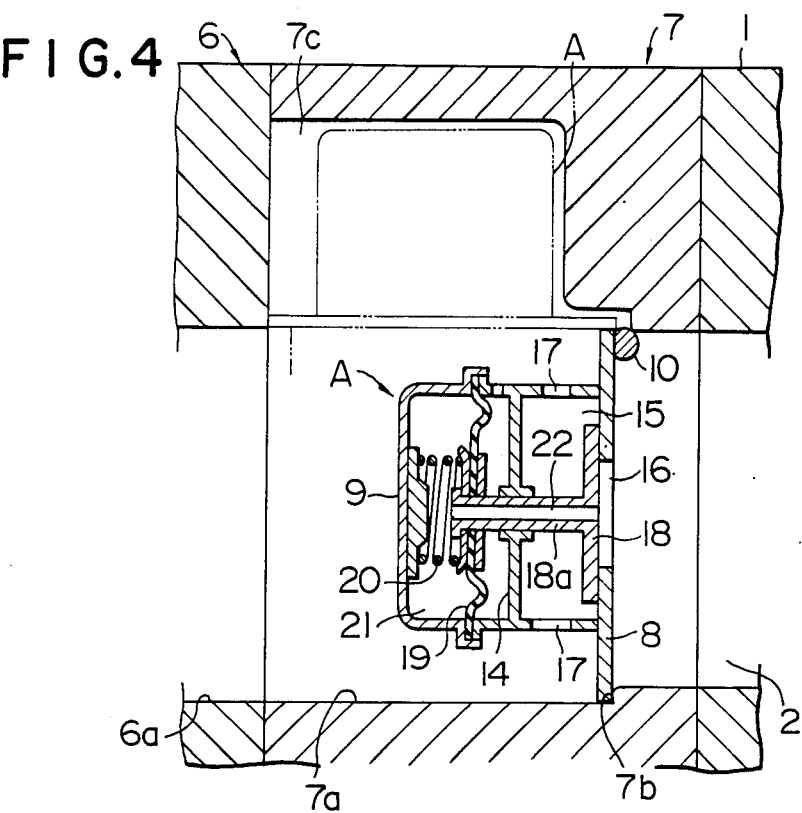
FIG. 4 is a sectional view showing the details of the timing valve.

It will be noted in FIG. 4 that the timing valve A includes a valve plate 8 having a valve opening 16 and a cup-shaped casing 9 attached to the valve plate 8 to cover the valve opening 16. The valve plate 8 is mounted on the valve support block 7 along one edge of the plate 8 by means of a rotatable shaft 10. The valve support block 7 is formed in each of the connecting passages 7a with a valve seat 7b which is adapted to receive three side edges of the valve plate 8. The valve support block 7 is formed in the wall of each connecting passage 7a adjacent to the edge of the valve plate supported by the shaft 10 with a recess 7c which is sufficient to accommodate the timing valve A. It will thus be understood that the timing valve A can be moved between an operative position wherein it is seated at three side edges of the valve plate 8 on the valve seat 7b and a retracted position wherein the timing valve A is retracted from the passage 7a into the recess 7c so that the branch intake passage 6a is wide open to the intake port 2. It will be noted in FIG. 3 that the valve plates 8 are connected to the shaft 10 in common and the shaft 10 projects sidewards from the valve support block 7. The shaft 10 may comprise coaxial shaft portions 10a and 10b which are connected together by a coupling 11. The projected end of the shaft 10 is connected with a link 12 which is in turn connected with a vacuum actuator 13 so as to be actuated thereby. Thus, by operating the actuator 13, it is possible to move the timing valve A between the operative and retracted positions.

Figure 5:
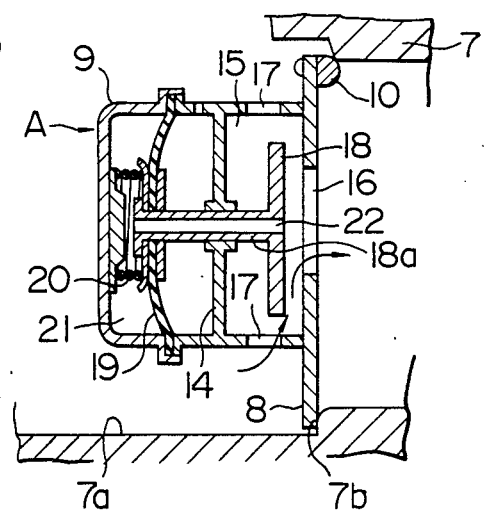
FIG. 5 is a sectional view showing the timing valve in the open position.

Referring to FIG. 4, it will be noted that the casing 9 of the timing valve A has a partition wall 14 defining a valve chamber 15 at a side adjacent to the valve plate 8. The casing 9 is formed with openings 17 opening to the valve chamber 15. At the side of the partition wall 14 opposite to the valve chamber 15, there is provided a diaphragm 19 which defines a suction pressure chamber 21 at the side remote from the valve chamber 15. A valve member 18 is disposed in the valve chamber 15 to close the opening 16 in the valve plate 8. The valve member 18 has a valve stem 18a which extends through the partition wall 14 and connected at the end with the diaphragm 19. The diaphragm 19 is biased by a spring 20 toward the valve plate 8 so that the valve member 18 is forced into a position wherein it closes the opening 16 in the valve plate 8. In the valve stem 18a, there is formed a suction pressure passage 22 so that the pressure in the intake port 2 is transmitted into the suction pressure chamber 21. It will therefore be understood that when the pressure in the intake port 2 is decreased below a predetermined level, or in other words, when the suction pressure in the intake port 2 becomes stronger than a predetermined level, the suction pressure transmitted into the suction pressure chamber 21 causes a deflection of the diaphragm 19 toward left as seen in the plane of FIG. 4 against the action of the spring 20 to make the valve member 18 move away from the valve plate 8 to thereby uncover the opening 16 as shown in FIG. 5.

It will be noted in FIG. 4 that the valve member 18 is subjected at a back surface which is exposed to the valve chamber 15 with a pressure in the intake passage upstream the timing valve A and at a front surface which is faced to the intake port 2 with a pressure in the intake port 2. In the intake stroke, the intake valve 4 is opened and the piston 27 starts to descend so that a suction pressure is produced in the combustion chamber 1b and the suction pressure is transmitted into the intake port 2. Since the valve chamber 15 is under the atmospheric pressure, the suction pressure in the intake port 2 serves to draw the valve member 18 firmly to the closed position. Thus, the biasing spring 20 is assisted by the suction pressure in the intake port 2 to force the valve member 18 to the closed position.

The suction pressure in the intake port 2 is transmitted through the passage 22 to the chamber 21 to act on the diaphragm 19. As the piston 27 descends, the suction pressure is intensified and, when the suction pressure is intensified beyond a predetermined level, the diaphragm 19 is moved against the action of the the spring 20 toward left as seen in the plane of FIG. 4 so that the valve plate 18 is moved apart from the valve seat 7b. Thus, the intake air is allowed to pass through the valve opening 16 into the intake port 2 and then into the combustion chamber 1b. Since a strong suction pressure prevails at this instance in the combustion chamber 1b, the intake air rushes into the combustion chamber 1b and compressed adiabatically under its own inertia.

The timing at which the timing valve A is opened can be determined appropriately by selecting various factors which affect the timing. One of such factors is the volume of the intake passage downstrem the timing valve, that is, in the case of the illustrated embodiment, the volume of the intake port 2. Other factors affecting the valve opening timing are the volume of the suction pressure chamber 21 of the timing valve A, the cross-sectional area of the suction pressure passage 22, the rate of the spring 20, the surface area of the valve member 18, the area of the valve opening 16 and the area of the diaphragm 19. The valve opening timing changes in accordance with the engine speed so that it is important to determine the above factors to obtain a desired valve opening timing under a desired engine speed range.

Figure 6:
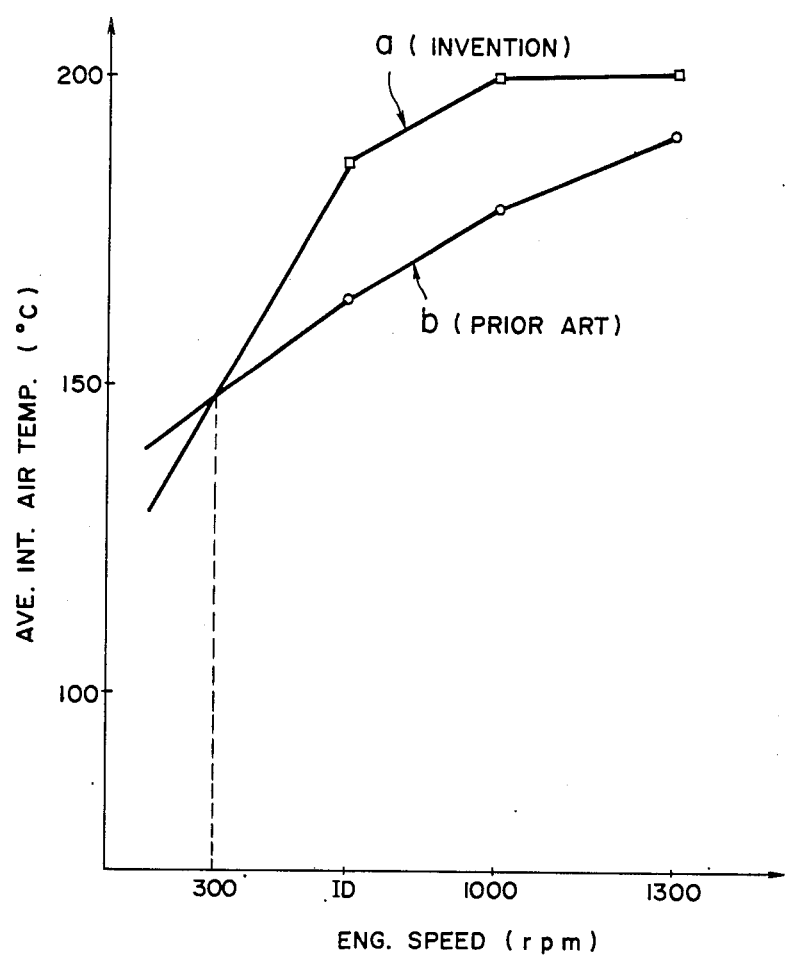
FIG. 6 is a diagram showing the temperature of the intake air in the combustion chamber.

In order to have the intake air adiabatically compressed, it is also important to have the timing valve closed not earlier than the bottom dead center. FIG. 6 shows the average temperature of the intake air in the cylinder under various engine rotating speed. The temperature is measured by cranking the engine without preheating of the air and fuel injection so that the test results can be considered as being indicative of the effects of adiabatic compression. In FIG. 6, the line a indicates the temperatures in an intake system embodying the present invention and the line b indicates those in a conventional intake system. It will be seen in FIG. 6 that, under the engine speed higher than 300 rpm, the intake air temperature in the intake system of the present invention is higher than in the conventional system. Under the engine speed lower than 300 rpm, the intake air temperature in the intake system of the present invention is lower than that in the conventional system. This is understood as being caused by the fact that the timing valve A is closed earlier than the bottom dead center so that the effect of the adiabatic compression cannot exceed the effect of the adiabatic expansion which occurs when the intake air of the atmospheric pressure is introduced into the combustion chamber which is under a strong suction pressure.

Referring to FIGS. 7(a) and (b), under the engine rotating speed of 750 rpm, the intake air pressure decreases after the top dead center along the curve c and, when the intake air pressure dercreases to the point d, the timing valve A is opened to start to introduce the intake air into the combustion chamber 1b. Then, the pressure in the combustion chamber 1b is increased along the curve e. At this instance, the valve member 18 is not subjected to any pressure difference forcing it into the closed position so that the timing valve is closed at a pressure which is higher than the valve opening pressure. In the embodiment described with reference to FIG. 6, the timing valve A is closed substantially at the bottom dead center and the pressure in the combustion chamber 1b is increased by that time to a valve greater than the atmospheric pressure due to the adiabatic compression.

Figure 8:
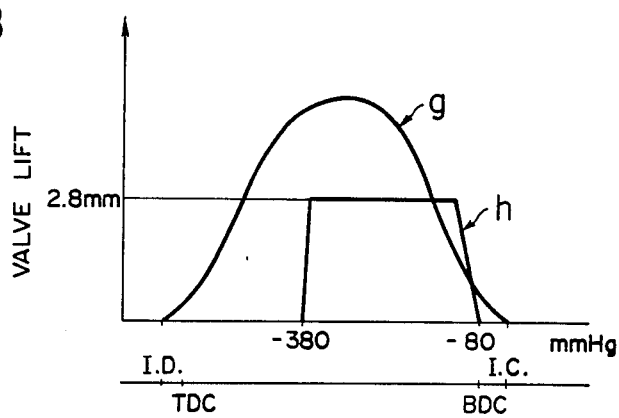
FIG. 8 is a diagram showing valve timings.

Under the engine rotating speed of 300 rpm, the pressure increase after the opening of the timing valve A proceeds more rapidly in terms of the engine crank angle as compared with that under the speed of 750 rpm and the timing valve A closes before the bottom dead center as shown by the point f. Thereafter, the pressure in the combustion chamber 1b is decreased slightly since the piston 27 descend further. Thus, it will be seen in the embodiment described above, the temperature of the intake air in the combustion chamber 1b is lower than in conventional intake system. It should be noted, however, that the illustrated embodiment provides good results under a speed range between the idling speed and 1300 rpm. When it is desired to obtain a good starting and warming up properties, the aforementioned factors may be determined so that a high temperature can be obtained under the engine speed range of 300 to 400 rpm. To deal with the problems of pollutant emissions, the factors may be determined so that a high intake air temperature is obtained up to about 3000 rpm. A typical example of the valve timing is shown in FIG. 8 in which the curve g designates the timing of the intake valve 4 and the line h designates the timing of the valve A.

Figure 9:
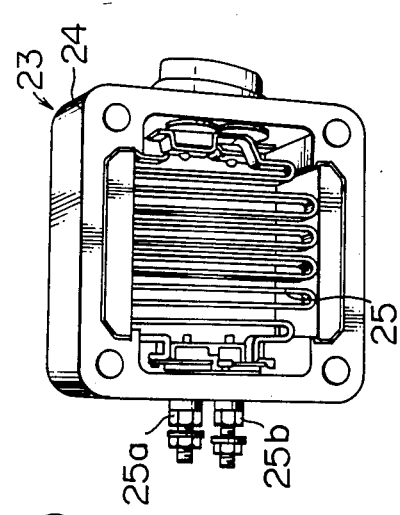
FIG. 9 is a perspective view of the intake air heating device provided in the intake passage.

Referring to FIG. 9, it will be noted that the heater 23 provided in the main intake passage 6b of the manifold 6 comprises an annular casing 24 constituting a part of the main intake passage 6b and a heating wire 25 located in the casing 24. The heating wire 25 has terminals 25a and 25b at the opposite ends for connection with a power source.

The actuator 13 for controlling the timing valves A is connected with a vacuum pump P. The actuator 13 and the heater 23 are controlled by a control unit 26 which receives an engine speed signal $S_1$, an engine load signal S₂, an engine cooling water temperature signal S₃ and an engine combustion start signal S₄ which may be derived from the output of the engine-driven generator.

Figure 7:
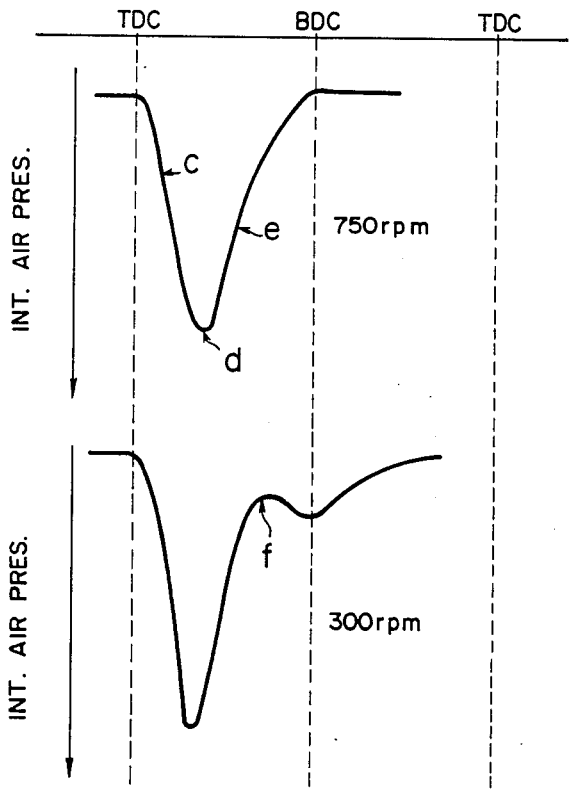
FIGS. 7(a) and (b) show suction pressures in the combustion chamber.
Figure 10:
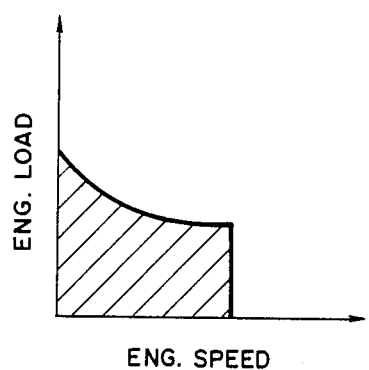
FIG. 10 is a charge showing the engine operating range wherein the timing valve is positioned in the intake passage.

As shown in the flow chart of FIG. 7, the engine cooling water temperature signal S₃ is at first read in step 50 and a judgement is made in step 51 as to whether the engine cooling water temperature is below −5° C. When the engine cooling water temperature is below −5° C., the actuator 13 is operated in step 52 to move the timing valve A to the operative position. Thereafter, a further judgement is made in step 53 as to whether the engine cooling water temperature is below −15° C. When the engine cooling water temperature is below −15° C., the air heater 23 is turned on in step 54 and the engine combustion start signal S₄ is read in step 55 and a judgement is made in step 56 as to whether the engine combustion is started. When the engine combustion is not started, the steps 55 and 56 are repeated. When it is judged that the engine combustion is started, the air heater 23 is turned off in step 57. Then, the engine speed signal S₁ and the engine load signal S₂ are read respectively in steps 58 and 59 and a judgement is made in step 60 as to whether the engine operating condition is in a timing valve operating zone. The timing valve operating zone may be defined as a zone wherein the engine speed and engine load are below predetermined levels. An example of such zone is shown in FIG. 10 by a shadowed area. When it is judged that the engine operating condition is not in the timing valve operating zone, the actuator 13 is de-energized in step 61 to move the timing valves A into the retracted position. When it is judged in the step 53 that the engine cooling water temperature is not below −15° C., the step 58 is carried out.

When it is judged that the engine operating condition is in the timing valve operating zone, the timing valves A are held in the operative positions and the steps 58, 59 and 60 are repeated. When the timing valve A is in the operative position, the valve plate 8 sits on the seat 7b to close the passage 7a. During engine start, the timing valve A is located in the operative position as soon as the vacuum pump P is energized. When the engine is cranked, there is produced a suction pressure in the cylinder as the piston 27 descends and as the suction pressure exceeds the aforementioned predetermined level, the diaphragm 19 is deflected to move the valve member 18 away from the valve plate 8 to thereby uncover the opening 16. Thus, the intake air is drawn from the intake passage 6a into the intake port 2 producing a high speed flow which is directed into the combustion chamber 1b. The intake air thus introduced into the combustion chamber 1b is therefore compressed under the inertia of the high speed flow. This will be effective to raise the temperature of the intake air in the combustion chamber 1b to thereby ensure stable combustion of fuel. The same operation is also obtained after the engine start as long as the engine operating condition is in the aforementioned timing valve operating range.

In case of a multiple-cylinder engine wherein intake strokes of the respective cylinders are overlapped with each other, the timing valve may be designed so that two or more of the timing valves do not open simultaneously by determining the aforementioned factors appropriately. By avoiding simultaneous opening of two or more timing valves A, it is possible to have the intake air compressed effectively under the inertia of the high speed intake air flow.

It should be noted that the air heater 23 provided in the main intake passage 6b is effective to enhance the temperature raise due to the adiabatic compression of the intake air. Assuming that the intake air upstream the valve A has a temperature $T_o$ and a pressure $P_o$ and the intake air in the combustion chamber has a temperature $T_1$ and a pressure $P_1$, the following relationship is established:

$$T_1/T_o = (P_o/P_1)^{k-1/k}$$

where k is the specific heat ratio. Assuming further that the valve $P_o/P_1$ is 2, the temperature $T_1$ will be 305° K. where the temperature $T_o$ is 250° k. However, when the intake air is preheated to 300° k, the temperature $T_1$ will be as high as 366° k. It will therefore be understood that an increase in the temperature $T_o$ by 50° k will result in an increase in the temperature $T_1$ by 61° k so that the preheating causes a temperature increase which is greater than the temperature increase under the preheating.

Figure 12:
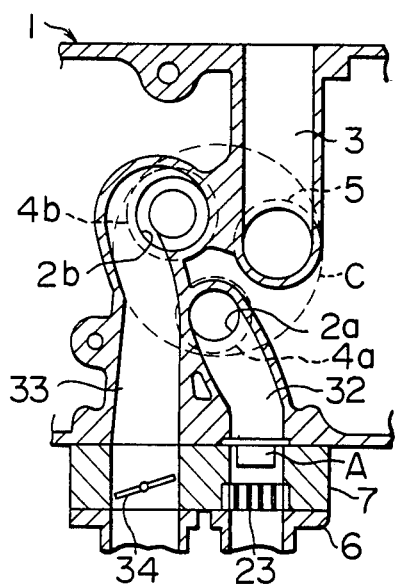

Referring now to FIG. 12, the embodiment shown therein includes a cylinder C formed with a pair of intake ports 2a and 2b, respectively provided with intake valves 4a and 4b. The intake port 2a is connected with a primary intake passage 32 of a smaller cross-sectional area whereas the intake port 2b is connected with a secondary intake passage 33 of a larger cross-sectional area. The primary intake passage 32 is provided with an air heater 23 and a valve A which are arranged in this order as seen from the upstream side. The heater 23 and the valve A are of structures similar to those in the previous embodiment and operated in the same manner as in the previous embodiment. The only difference is that the valve A is fixed in position and is not retractable. The secondary intake passage 33 is provided with a shut-off valve 34 which is closed under the engine cooling water temperature below −5° C. when the engine operating condition is in the shadowed area in FIG. 10. It will therefore be understood that the valve A is operated in the same manner as in the previous embodiment as long as the shut-off valve 34 is closed but the valve A is bypassed when the shut-off valve 34 is opened.

Although the invention has been described with reference to a specific structure of the timing valve, other types of timing valves may be used. For example, a butterfly type valve can be used without any difficulty. The air heater 23 may be operated even after the engine combustion has started. Further, the suction pressure operated valves may be provided in a selected number of cylinders of a multiple cylinder engine. The present invention can also be applied to a rotary piston engine It should therefore be noted that the invention is not limited to the details of the illustrated structures but changes and modifications may be made without departing from the scope of the appended claims.

We claim:

1. An intake system for diesel cycle engines comprising intake passage means leading through intake port means to combustion chamber means, timing suction pressure responsive valve means provided in said intake passage means for closing said intake passage means in a beginning period of intake stroke wherein the intake port means is opened to said combustion chamber means and opening the intake passage means in the remainder period of the intake stroke, characterized by the fact that said valve means includes a valve member which is movable between a closed position wherein it closes the intake passage means and an open position wherein it opens the intake passage means, biasing means for biasing the valve member toward said closed position, said valve member having a first surface which is subjected in said closed position to a pressure in said intake passage means upstream the valve means and a second surface which is subjected in said closed position to a pressure in the combustion chamber means so that a difference between the pressures on the first and second surfaces of the valve member assists the biasing means biasing the valve member to the closed position, valve actuator means comprising suction pressure chamber means defined at least partly by pressure responsive movable member, means connecting said movable member with said valve member so that a movement of the movable member is transmitted to the valve member and communicating passage means for communicating said suction pressure chamber means with said intake passage means downstream the valve means so that a suction pressure produced in said intake passage means downstream the valve means in the intake stroke is introduced into the suction pressure chamber means to cause a movement of the movable member for moving the valve member under said suction pressure from the closed position to the open position after said beginning period of the intake stroke and maintaining the valve member at the open position at least until bottom dead center of the intake stroke.

2. An intake system in accordance with claim 1 in which said valve member is directly connected with the pressure responsive movable member and the valve member and the movable member are housed in a casing to form a single valve unit.

3. An intake system in accordance with claim 1 in which said communicating passage means is formed in said valve member.

4. An intake system in accordance with claim 1 in which said pressure responsive movable member is a diaphragm.

5. An intake system in accordance with claim 2 in which said valve means is provided retractably in the intake passage means and control means is provided for retracting said timing valve means from said intake passage means except under a predetermined engine operating condition.

6. An engine intake system in accordance with claim 1 which includes second intake passage means leading to the combustion chamber means, shut-off valve means provided in said second intake passage means, means for closing said shut-off valve means under a predetermined engine operating condition.

7. An intake system in accordance with claim 5 in which said predetermined engine operating condition is a condition where engine temperature is below a predetermined valve.

8. An intake system in accordance with claim 1 which includes intake air heating means provided in the intake passage means upstream the suction pressure responsive valve means.

9. An intake system in accordance with claim 8 in which means is provided for operating said heating means and said suction pressure responsive valve means for engine start and stopping operation of the heating means when engine combustion is started.

10. An intake system in accordance with claim 9 in which means is provided for operating the heating means and the valve means under an engine temperature below a predetermined value.

11. An intake system in accordance with claim 3 in which said pressure responsive movable member is a diaphragm.

12. An intake system in accordance with claim 3 in which said valve means is provided retractably in the intake passage means and control means is provided for retracting said timing valve means from said intake passage means except under a predetermined engine operation condition.

13. An intake system in accordance with claim 3 which includes second intake passage means leading to the combustion chamber means, shut-off valve means provided in said second intake passage means, means for closing said shut-off valve means under a predetermined engine operating condition.

14. An intake system in accordance with claim 12 in which said predetermined engine operating condition is a condition where engine temperature is below a predetermined value.

15. An intake system in accordance with claim 3 which includes intake air heating means provided in the intake passage means upstream the suction pressure responsive valve means.

16. An intake system in accordance with claim 11 in which said valve means is provided retractably in the intake passage means and control means is provided for retracting said timing valve means from said intake passage means except under a predetermined engine operating condition.

17. An intake system in accordance with claim 11 which includes second intake passage means leading to the combustion chamber means, shut-off valve means provided in said second intake passage means, means for closing said shut-off valve means under a predetermined engine operating condition.

18. An intake system in accordance with claim 11 which includes intake air heating means provided in the intake passage means upstream the suction pressure responsive valve means.

19. An intake system for diesel cycle engines in accordance with claim 1, in which said combustion chamber means is defined by cylinder means and piston means disposed in said cylinder means for reciprocating movement, said piston means being formed with cavity means opening to said combustion chamber means, and fuel injection means provided on said cylinder means to inject fuel toward a side wall surface of said cavity means.

20. An intake system for diesel cycle engines which includes intake passage means leading to combustion chamber means, timing valve means provided in said intake passage means for closing said intake passage means in an initial period of intake stroke and opening said intake passage means in an intermediate period of the intake stroke until at least bottom dead center, heating means provided in said intake passage means upstream the timing valve means, and operating means for operating the heating means and making the timing valve means operative under a low engine temperature.

21. An intake system in accordance with claim 20 in which said predetermined engine operating condition is an engine starting condition.

22. An intake system in accordance with claim 20, in which said operating means is means for making the timing valve means operative under an engine temperature lower than a first predetermined value and operating said heating means under an engine temperature lower than a second predetermined value.

23. An intake system in accordance with claim 20, which includes bypass passage means bypassing said timing valve means, shut-off valve means provided in said bypass passage means, means for closing the shut-off valve means in an engine operating condition wherein the timing valve means is made operative and opening the shut-off valve means in an engine operating condition wherein the timing valve means remains inoperative.

24. An intake system for diesel cycle engines in accordance with claim 20, in which said combustion chamber means is defined by cylinder means and piston means disposed in said cylinder means for reciprocating movement, said piston means being formed with cavity means opening to said combustion chamber means, fuel injection means provided on said cylinder means to inject fuel toward a side wall surface of said cavity means.

* * * * *